United States Patent
Kuwano et al.

(10) Patent No.: US 6,850,027 B2
(45) Date of Patent: Feb. 1, 2005

(54) STEPPING MOTOR DRIVER

(75) Inventors: Yoshifumi Kuwano, Kiryu (JP); Akio Takemori, Kiryu (JP); Yasuo Matsuda, Kiryu (JP); Yoshihiro Okumatsu, Miyazaki (JP); Atsuo Kawamura, Yokohama (JP)

(73) Assignee: Japan Servo Co., Ltd., Tokyo (JP)

( * ) Notice: Subject to any disclaimer, the term of this patent is extended or adjusted under 35 U.S.C. 154(b) by 127 days.

(21) Appl. No.: 10/389,775

(22) Filed: Mar. 18, 2003

(65) Prior Publication Data

US 2003/0178965 A1 Sep. 25, 2003

(30) Foreign Application Priority Data

Mar. 19, 2002 (JP) ..................................... 2002-076665

(51) Int. Cl.[7] .............................................. H02P 8/00
(52) U.S. Cl. ....................... 318/685; 318/696; 318/700; 318/701; 318/714; 318/720; 318/721; 318/722; 318/723; 318/724
(58) Field of Search ................................ 318/685, 696, 318/700, 701, 714–720, 722–724, 799–813; 310/49

(56) References Cited

U.S. PATENT DOCUMENTS

| | | | | |
|---|---|---|---|---|
| 3,628,119 A | * | 12/1971 | Abraham ..................... | 318/685 |
| 3,909,125 A | * | 9/1975 | Reehil et al. ................ | 399/394 |
| 4,289,983 A | * | 9/1981 | Bengnar et al. ............. | 310/49 R |
| 4,734,632 A | * | 3/1988 | Kamikura et al. ........... | 318/685 |
| 4,837,493 A | * | 6/1989 | Maeno et al. ................ | 318/685 |
| 4,949,027 A | * | 8/1990 | Baur ............................ | 318/696 |
| 5,841,263 A | * | 11/1998 | Kaneko et al. ............... | 318/807 |
| 6,329,781 B1 | * | 12/2001 | Matsui et al. ................ | 318/717 |
| 6,501,243 B1 | * | 12/2002 | Kaneko et al. ............... | 318/700 |
| 6,639,379 B2 | * | 10/2003 | Matsushita et al. .......... | 318/727 |
| 6,670,782 B2 | * | 12/2003 | Kuwano et al. .............. | 318/685 |
| 6,674,261 B2 | * | 1/2004 | Takahashi et al. ........... | 318/721 |
| 6,674,262 B2 | * | 1/2004 | Kitajima et al. ............. | 318/722 |
| 6,747,433 B2 | * | 6/2004 | Kuwano et al. .............. | 318/685 |
| 6,788,024 B2 | * | 9/2004 | Kaneko et al. ............... | 318/807 |
| 2003/0173929 A1 | * | 9/2003 | Takemori et al. ............ | 318/685 |

FOREIGN PATENT DOCUMENTS

| | | | | | |
|---|---|---|---|---|---|
| JP | 360255097 A | * | 12/1985 | ............. | H02P/8/00 |
| JP | 363092297 A | * | 4/1988 | ............. | H02P/8/00 |
| JP | 404079795 A | * | 3/1992 | ............. | H02P/8/00 |
| JP | 06-225595 | * | 8/1994 | ............. | H02P/8/00 |
| JP | 06-225595 A | | 8/1994 | | |
| JP | 11-252994 | * | 9/1999 | ............. | H02P/8/00 |
| JP | 2003-284389 | * | 3/2004 | ............. | H02P/8/00 |

OTHER PUBLICATIONS

Sheng–Ming Yang and Pei–Der Su, 2001, IEEE PEDS, pp. 749–754.*

* cited by examiner

*Primary Examiner*—David Martin
*Assistant Examiner*—Tyrone Smith
(74) *Attorney, Agent, or Firm*—Birch, Stewart, Kolasch & Birch, LLP

(57) ABSTRACT

The stepping motor driver comprises an inverter for feeding stepped currents to windings of a stepping motor, a position detector for obtaining a detected angle of a rotor of the stepping motor and a current controller for controlling the inverter. In a d-q rotational coordinate system in which the d-axis is in the direction of the magnetic flux of the rotor and the q-axis is in the direction perpendicular to the d-axis, an excitation angle for a winding is determined from a d-axis component and a q-axis component of a command current to the winding, a lead angle control signal is computed from the excitation angle, and a phase of an applied voltage to the stepping motor is controlled using the lead angle control signal.

17 Claims, 3 Drawing Sheets

STEPPING MOTOR DRIVER

BACKGROUND OF THE INVENTION

1. Field of the Invention

The present invention concerns a stepping motor driver for controlling rotational angular position and rotational speed of a rotor of a stepping motor.

2. Description of the Prior Art

With the high functionalization of systems equipped with motors, motors of which noise and vibration are low, and of which rotational speed ranges are wide, are being demanded. A stepping motor is caused to make a stepping rotation by changing instantaneously excitation currents for windings at each time when a set of external command pulses is given. Accordingly, it is necessary to reduce noise and vibration generated when the excitation currents are changed and to prevent the motor from stepping-out.

To reduce noise and vibration, and to prevent the motor from stepping-out, a micro-step drive using an inverter of a PWM (pulse width modulation) type to smoothly change excitation currents for windings is being generally adopted.

The micro-step drive is realized by feeding motor windings with stepped currents, obtained by transforming currents of sinusoidal wave forms, with phase differences according to the number of phases of the motor. Accordingly, it is necessary to control a plurality of phase currents according to the number of the phases of the motor. So, the construction of the driver becomes complicated with the increase of the number of phases of the motor.

To simplify the construction of the driver, it is conceived to apply an inverter controller that is generally used for controlling an AC servomotor, in which a coordinate transformation into a rotational coordinate system is adopted, to the stepping motor driver. The inverter controller technique is suitable for realizing a micro step drive with a high resolution, since the rotation angle can be controlled directly.

Examples of the application of the rotational coordinate control technique for stepping motors are still limited. Among these examples, there is a stepping motor driver for preventing the motor from stepping-out and for realizing a micro step drive, disclosed in Unexamined Japanese Patent Publication No.6-225595 (herein after referred to as the prior art). In this driver, phase currents in a fixed coordinate system are transformed into phase currents in a d-q rotational coordinate system, in which the d-axis is in the direction of the magnetic flux of the rotor and the q-axis is in the direction perpendicular to the d-axis, and the control of the currents applied to the motor are dealt with in the rotational coordinate system.

In the stepping motor driver disclosed in the prior art, assuming that the stepping motor is similar to a synchronous permanent magnet motor, angular position of the rotor is detected by an encoder connected to the stepping motor, and closed loop control systems for current control, for velocity control and for position control are composed. Detected signals representing the angular position of the rotor are transformed into signals in the d-q rotational coordinate system and the position control is conducted in the d-q rotational coordinate system. To simplify the construction of the control system, non-interference elements of the d-axis and the q-axis components are omitted, and the current commands are given directly on the d-axis and on the q-axis.

In this driver, since the angular position of the rotor of the motor is controlled so as to make the detected position signal coincide with the command position, a micro step drive of the stepping motor in accordance with the resolution of the command position and that of the position detection device is possible.

In the stepping motor driver of the prior art as mentioned above, the direction of the current fed to the motor is made to coincide with the direction of the q-axis and the current is controlled according to the velocity deviation. Accordingly, a position detection device, a position controller and a velocity controller are required to be provided to effectuate the position control. Thus, there is a problem that the construction of the stepping motor driver is complicated, and consequently, is expensive.

Also in the stepping motor driver of the prior art, there is a problem that a vibration of the stepping motor occurs when it is stopped.

Further, in the stepping motor driver of the prior art, it is necessary to make the applied voltage to the motor always greater than, or equal to, the sum of the induced voltage and the internal voltage drop of the motor, in order to control the current in the q-axis direction according to the variation in the load. Since a stepping motor is a multipolar motor having some fifty pairs of magnetic poles in general, the voltage drop due to the inductance component is large. Accordingly, there is a problem that the controllable region of the stepping motor is limited and the stepping motor can not be controlled to a high rotational speed region.

SUMMARY OF THE INVENTION

It is an object of the present invention to solve the above mentioned problems and to provide a stepping motor driver, for a polyphase stepping motor, that has a simple structure, that is low in price, of which noise and vibration are low, by which it is possible to stably control a stepping motor to a high rotational speed region, and that has a micro step drive function with high degree of accuracy.

According to a preferred embodiment of the present invention to achieve the above object, there is provided a stepping motor driver comprising:

an inverter for feeding stepped currents to windings of a stepping motor;

a position detection means for obtaining a detected angle of a rotor of the stepping motor; and a current control means for controlling the inverter, wherein:

in a d-q rotational coordinate system in which the d-axis is in the direction of the magnetic flux of the rotor of the stepping motor and the q-axis is in the direction perpendicular to the d-axis, an excitation angle for a winding is determined from a d-axis component and a q-axis component of a command current to the winding;

a lead angle control signal is computed from the excitation angle; and a phase of an applied voltage to the stepping motor is controlled using the lead angle control signal.

The stepping motor driver according to the present invention drives a stepping motor in the condition conformable to the voltage equation for a synchronous motor even in a high speed region. Accordingly, a stable driving of the stepping motor, matching the load and being prevented from a stepping-out, can be maintained.

Also, since command signals given from the outside are used in the control computation, a stable operation of a stepping motor can be realized.

Further, the stepping motor driver according to the present invention has a simple structure, and accordingly, is low in price. It can reduce noise and vibration of the motor, and can be used as a stepping motor driver for a polyphase stepping motor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
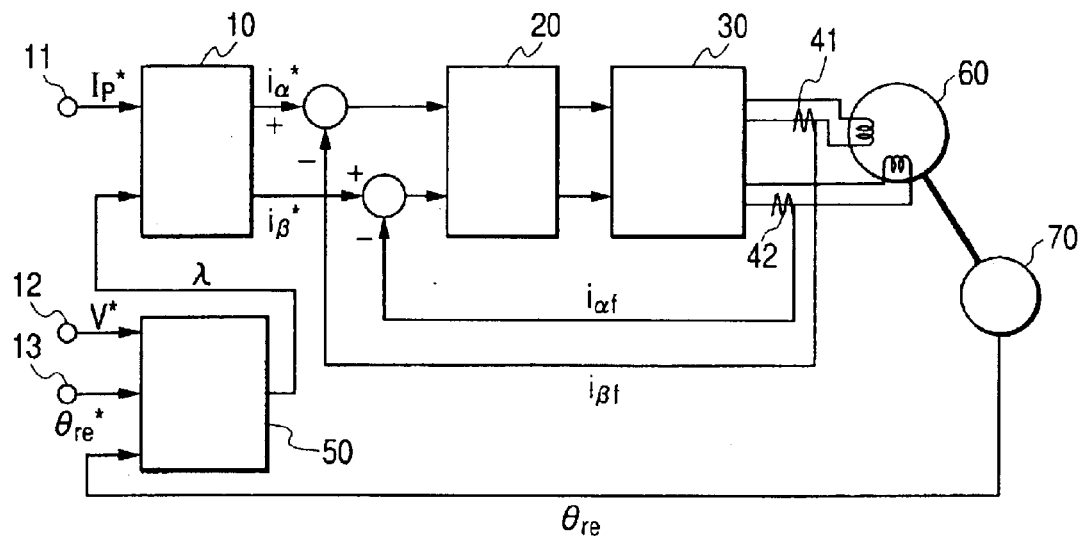
FIG. 1 is a block diagram of a stepping motor driver according to an embodiment of the present invention.

First, the principle to be applied to the stepping motor driver according to the present invention is explained.

An excitation angle $\gamma$ for a stepping motor that is a kind of a synchronous motor can be determined by an equation (1) as follows derived from the voltage equation.

$$\gamma = \tan^{-1}(v_q^*/v_d^*) \quad (1)$$

where $v_d^*$ and $v_q^*$ are a d-axis component and a q-axis component of a command voltage respectively, in a d-q rotational coordinate system in which the d-axis is in the direction of the magnetic flux of a rotor of a motor and the q-axis is in the direction perpendicular to the d-axis.

Expressing a voltage applied to the motor by V, the source voltage by $V_0$, the d-axis component and the q-axis component of the voltage applied to the motor by $v_d$ and $v_q$ respectively, the current in the motor winding by $I_0$, the d-axis component and the q-axis component of the current in the motor winding by $i_d$ and $i_q$ respectively, relations expressed by equations (2) and (3) as follows are obtained.

$$V_0 \geq V = (v_d^2 + v_q^2)^{1/2} \quad (2)$$

$$I_0 = (i_d^2 + i_q^2)^{1/2} \quad (3)$$

The voltage equation of the motor concerning the d-axis component $v_d$ and the q-axis component $v_q$ can be expressed by an equation (4) as follows.

$$\begin{bmatrix} v_d \\ v_q \end{bmatrix} = \begin{bmatrix} R + pL_d & -\omega_{re}L_q \\ \omega_{re}L_d & R + pL_q \end{bmatrix} \begin{bmatrix} i_d \\ i_q \end{bmatrix} + \omega_{re}\Phi_m \begin{bmatrix} 0 \\ 1 \end{bmatrix} \quad (4)$$

where p is a differential operator, $L_d$ is the d-axis component of the inductance of the winding, $L_q$ is the q-axis component of the inductance of the winding, $\omega_{re}$ is the fundamental frequency of the current in the winding of the motor, and $\Phi_m$ is the magnetic flux of the motor.

Here, assuming $pL_d = pL_q = 0$, and $R \ll \omega_{re}L$ in a steady condition at a high rotational speed, equations (5) and (6) as follows are obtained from the equation (4).

$$v_d = -\omega_{re}L_q i_q \quad (5)$$

$$v_q = \omega_{re}L_d i_d + \omega_{re}\Phi_m \quad (6)$$

Using $v_d$ and $v_q$ in the equations (5) and (6) for $v_d$ and $v_q$ in the equations (2) and (3), an equation (7) as follows is obtained.

$$V_0^2 \geq V^2 = (-\omega_{re}L_q i_q)^2 + (\omega_{re}L_d i_d + \omega_{re}\Phi_m)^2 \quad (7)$$

In the equation (7), it is apparent that the maximum voltage applied to the motor equals the source voltage $V_0$. Additionally, $\omega_{re}\Phi_m$ equals the speed electromotive force $E_{emf}$.

The d-axis component $i_d$ of the current in the winding is derived from the equation (7).

$$i_d = (1/L_d)\{\pm[(V/\omega_{re})^2 - (L_q i_q)^2]^{1/2} - \Phi_m\} \quad (8)$$

In the equation (8), in the case in which the voltage is applied to the motor through a PWM inverter for example, the voltage V applied to the motor that is equal to the sum of the speed electromotive force of the motor and the voltage drop can be obtained by controlling the duty ratio of the PWM inverter. However, when the fundamental frequency $\omega_{re}$ of the motor is raised to a certain level, the voltage enough to control the current can not be maintained, since the speed electromotive force $E_{emf} = \omega_{re}\Phi_m$ would become larger than the source voltage $V_0$, but the voltage V applied to the motor remains in the value equal to the source voltage $V_0$ that is constant. That is, the control region of the motor is classified into two regions, namely, an applied voltage variable region and an applied voltage invariable region. In the applied voltage invariable region, the d-axis component $i_d$ of the current in the motor winding can be expressed by an equation (9) as follows.

$$i_d = (1/L_d)\{\pm[(V_0/\omega_{re})^2 - (L_q i_q)^2]^{1/2} - \Phi_m\} \quad (9)$$

Now, a torque T produced by the motor is proportional to the q-axis component $i_q$ of the current in the motor winding and can be expressed by an equation (10) as follows.

$$T = k_L i_q \quad (10)$$

where $k_L$ is a proportion constant (torque constant).

In conducting a position control of a rotor of a stepping motor, it is necessary to increase the torque T produced in the motor, when a position deviation that is the difference between a command angle $\theta_{re}^*$ for the rotor and a detected angle $\theta_{re}$ of the rotor, both in the d-q rotational coordinate system, becomes large. Accordingly, a q-axis component $i_q^*$ of a command current should be controlled to be a value proportional to the position deviation, and can be expressed by an equation (11) as follows.

$$i_q^* = k(\theta_{re}^* - \theta_{re}) \quad (11)$$

where k is a proportional coefficient.

In general, a stepping motor is given a command angle from the outside with a train of pulses, and the frequency component of the command angle corresponds to a command velocity. Accordingly, being given the command angle $\theta_{re}^*$ the command velocity $\omega_{re}^*$ can be treated as a known value. Thus, the d-axis component $i_d^*$ of the command current can be given by an equation (12) as follows obtained by replacing the fundamental frequency $\omega_{re}$ of the motor, the q-axis component $i_q$ of the current in the motor winding and the voltage V applied to the motor in the equation (8) respectively by the command velocity $\theta_{re}^*$, the q-axis component $i_q^*$ of the command current and an amplitude $V^*$ of the command voltage.

$$i_d^* = (1/L_d)\{[(V^*/\omega_{re}^*)^2 - (L_q i_q^*)^2]^{1/2} - \Phi_m\} \tag{12}$$

Using these results, the d-axis component $v_d^*$ and the q-axis component $v_q^*$ of the command voltage can be obtained respectively by equations (13) and (14) as follows corresponding to the equations (5) and (6). Accordingly, the proper excitation angle $\gamma$ can be determined by the equation (1).

$$v_d^* = -\omega_{re}^* L_q i_q^* \tag{13}$$

$$v_q^* = \omega_{re}^* L_d i_d^* + \omega_{re}^* \Phi_m \tag{14}$$

Additionally, it is apparent that the excitation angle $\gamma$ is in the region between 0 and 90 degrees in electrical angle when the d-axis component $i_d^*$ of the command current is positive, and that the excitation angle $\gamma$ is in the region between 90 and 180 degrees in electrical angle when the d-axis component $i_d^*$ of the command current is negative, taking the d-axis as the reference axis.

Further additionally, the value obtained by adding the detected angle $\theta_{re}$ to the excitation angle $\gamma$ is used as a lead angle control signal $\lambda$ to be used in a coordinate transformation from the rotational coordinate system into the fixed coordinate system.

Next, an error induced by such as assumption and omission in the process of deriving the q-axis component $i_q^*$ of the command current is compensated. Such error can be reduced by correcting the proportion constant k in the equation (11) by, for example, a proportional, an integral and a differential compensation. Thus, the corrected q-axis component $i_q^*$ of the command current can be determined by an equation (15) as follows.

$$i_q^* = [k_{pq} + 1/(sk_{iq}) + sk_{dq}](\theta_{re}^* - \theta_{re}) \tag{15}$$

where, s is a Laplace operator, $k_{pq}$ is a proportional coefficient, $k_{iq}$ is an integral coefficient and $k_{dq}$ is a differential coefficient.

Further, an error induced by such as assumption and omission in the process of deriving the d-axis component $i_d^*$ of the command current is compensated. If there is a computational error, the difference between the amplitude $V_{dq}$ of the applied voltage, obtained by the square root of the sum of the square of the d-axis component $v_d^*$ of the command voltage and the square of the q-axis component $v_q^*$ of the command voltage, and the amplitude $V^*$ of the command voltage set as an input value appears. Hereinafter, the difference between the amplitude $V_{dq}$ of the applied voltage and the amplitude $V^*$ of the command voltage is referred to as the voltage error. Accordingly, the error in the d-axis component $i_d^*$ of the command current can be reduced using an equation (16) as follows obtained by subtracting the amplified voltage error from the equation (12). The voltage error can be amplified by an error compensator comprising a proportional compensator and an integral compensator, for example.

$$i_d^* = (1/L_d)\{[(V^*/\omega_{re}^*)^2 - (L_q i_q^*)^2]^{1/2} - \Phi_m\} - [k_{pv} + 1/(sk_{iv})](V^* - V_{dq}) \tag{16}$$

where $k_{pv}$ is a proportional coefficient and $k_{iv}$ is an integral coefficient. Thus, it is possible for the stepping motor driver according to the present invention to obtain the drive condition for the motor matching the load, in the stepping motor driving region where the applied voltage becomes invariable, by controlling the excitation angle $\gamma$ with the d-axis component $v_d^*$ and the q-axis component $v_q^*$ of the command voltage.

The d-axis component $v_d^*$ and the q-axis component $v_q^*$ of the command voltage can be produced using the command angle $\theta_{re}^*$, the detected angle $\theta_{re}$, the command velocity $\omega_{re}^*$ and the amplitude $V^*$ of the command voltage. Accordingly, the excitation angle $\gamma$ can be controlled by the command angle $\theta_{re}^*$, the detected angle $\theta_{re}$, the command velocity $\omega_{re}^*$ and the amplitude $V^*$ of the command voltage. These signals, except the detected angle $\theta_{re}$, are signals given from the command side. Thus, the stepping motor can be made to operate stably.

Also, the error in the q-axis component $i_q^*$ of the command current induced in the process of deriving the q-axis component $i_q^*$ can be reduced by determining it using the equation (15) that is obtained by correcting the proportion constant k concerning the position deviation by the proportional, the integral and the differential compensation.

Further, the error in the d-axis component $i_d^*$ of the command current induced in the process of deriving the d-axis component $i_d^*$ can also be reduced by correcting it by setting the amplitude $V^*$ of the command voltage, obtaining the difference between the amplitude $V^*$ of the command voltage and the amplitude $V_{dq}$ of the applied voltage obtained from the d-axis component $v_d^*$ and the q-axis component $v_q^*$ of the command voltage, and subtracting the amplified difference from the d-axis component $i_d^*$ of the command current that was determined before.

Now, embodiments of the stepping motor driver according to the present invention will be explained referring to the attached drawings.

FIG. 1 is a block diagram of a stepping motor driver according to an embodiment of the present invention.

The stepping motor driver comprises:

a PWM inverter 30 that is an inverter for feeding stepped currents to windings of a stepping motor 60;

a position detector 70 that is a position detection means connected directly to the stepping motor 60 for obtaining a detected angle $\theta_{re}$ of a rotor (not illustrated in the drawing) in a d-q rotational coordinate system;

a lead angle computing element 50 that is a lead angle computing means, that receives the detected angle $\theta_{re}$, an amplitude $V^*$ of a command voltage applied from the outside to a command voltage input terminal 12 and a command angle $\theta_{re}^*$ applied to a command angle input terminal 13, each in a d-q rotational coordinate system, and that outputs a lead angle control signal $\lambda$ obtained from a d-axis component $i_d^*$ and a q-axis component $i_q^*$ of a command current;

a command current value transformer 10 that is a command current value transformation means, that receives the lead angle control signal $\lambda$ and an amplitude $I_p^*$ of a command current applied from the outside to an amplitude of command current input terminal 11, that carries out a coordinate transformation according to an equation (17) as follows, and that outputs command current values $i_\alpha^*$ and $i_\beta^*$ in a fixed coordinate system;

$$\begin{bmatrix} i_\alpha^* \\ i_\beta^* \end{bmatrix} = \begin{bmatrix} \cos(\theta_{re} + \gamma) \\ \sin(\theta_{re} + \gamma) \end{bmatrix} \cdot I_p^* = \begin{bmatrix} \cos\lambda \\ \sin\lambda \end{bmatrix} \cdot I_p^* \tag{17}$$

a current detector 41 that is a current detection means, and that detects a motor current value $i_{\alpha f}$ of a phase;

another current detector 42 that is another current detection means, and that detects another motor current value $i_{\beta f}$ of another phase; and, a current controller 20 that is a current control means, that receives the difference between the command current value $i_\alpha^*$ and the motor current value $i_{\alpha f}$, and the difference between the command current value $i_\beta^*$ and the motor current value $i_{\beta f}$ that outputs current control signals to make the motor current value $i_{\alpha f}$ and the motor current value $i_{\beta f}$ respectively coincide with the command current value $i_\alpha^*$ and the command current value $i_\beta^*$, and that controls the PWM inverter 30 by the current control signals.

Thus, the PWM inverter 30 receives the current control signal from the current controller 20 and feeds proper applied voltage to the stepping motor 60.

Figure 2:
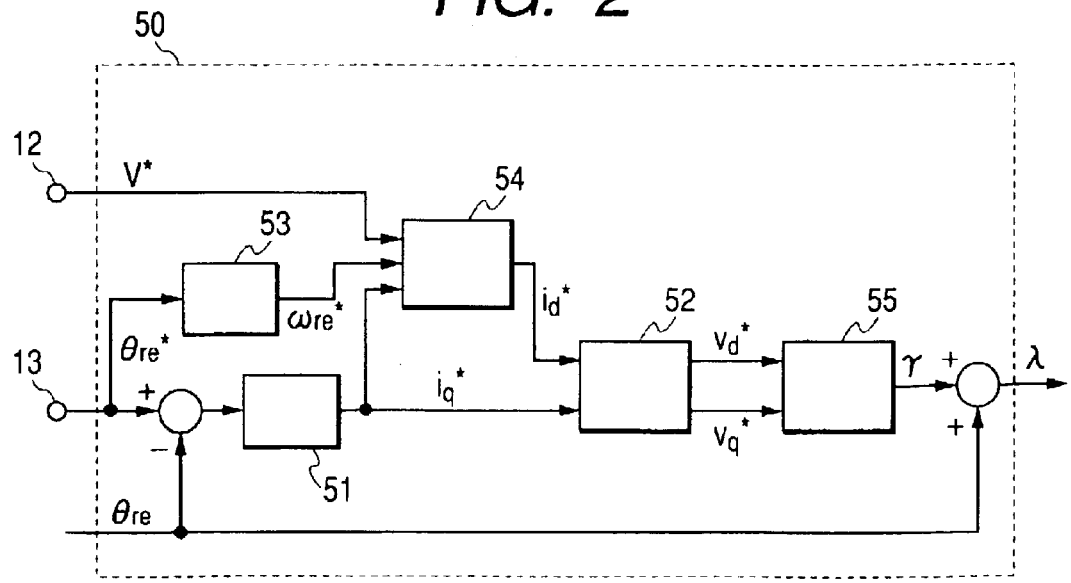
FIG. 2 is a block diagram of a lead angle computing element of the stepping motor driver according to a first embodiment of the present invention.

FIG. 2 is a block diagram of a lead angle computing element 50 of the stepping motor driver according to a first embodiment of the present invention. The lead angle computing element 50 comprises:

a compensator 51 that is a compensation means, that receives a position deviation that is the difference between the command angle $\theta_{re}^*$ and the detected angle $\theta_{re}$, that amplifies the position deviation by an amplification means comprising a differentiating element, and that outputs the q-axis component $i_q^*$ of the command current;

a velocity detector 53 that is a velocity detection means, that receives the command angle $\theta_{re}^*$, and that outputs the command velocity $\omega_{re}^*$;

a command current d-axis component computer 54 that is a command current d-axis component computer means, that receives the q-axis component $i_q^*$ of the command current that is the q-axis component of the command value of the current fed to the winding, the command velocity $\omega_{re}^*$ and the amplitude $V^*$ of the command voltage, and that outputs the d-axis component $i_d^*$ of the command current that is the d-axis component of the current fed to the winding;

a command voltage value computer 52 that is a command voltage value computer means, that receives the d-axis component $i_d^*$ and the q-axis component $i_q^*$ of the command current, and that outputs the d-axis component $v_d^*$ and the q-axis component $v_q^*$ of the command voltage; and an excitation angle computer 55 that is an excitation angle computer means, that receives the d-axis component $v_d^*$ and the q-axis component $v_q^*$ of the command voltage, and that outputs the excitation angle γ.

The detected angle $\theta_{re}$ is added to the excitation angle γ to obtain the lead angle control signal λ. Phase of the applied voltage fed to the stepping motor is controlled using this lead angle control signal λ.

Figure 3:
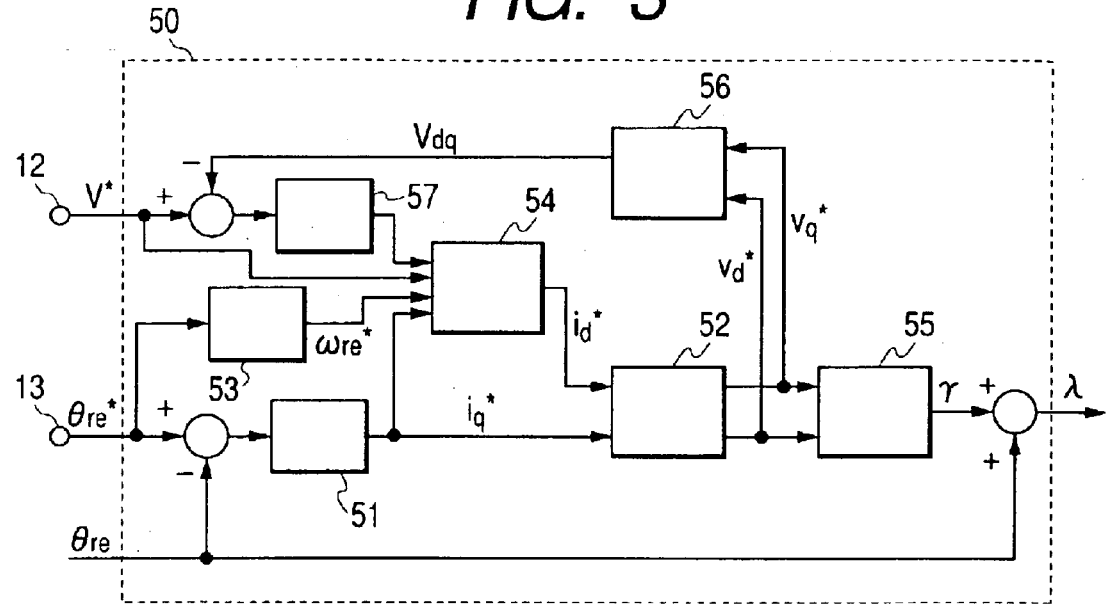
FIG. 3 is a block diagram of a lead angle computing element of the stepping motor driver according to a second embodiment of the present invention.

FIG. 3 is a block diagram of a lead angle computing element 50 of the stepping motor driver according to a second embodiment of the present invention.

In this embodiment, the accuracy of the d-axis component $i_d^*$ of the command current that is the output of the command current d-axis component computer 54 in the first embodiment is improved using the equation (16). For this purpose, an applied voltage amplitude computer 56 that is an applied voltage amplitude computer means and an error compensator 57 that is an error compensation means are added to the lead angle computing element 50 in the first embodiment.

The applied voltage amplitude computer 56 computes $[(v_d^*)^2+(v_q^*)^2]^{1/2}$, that is, the amplitude $V_{dq}$ of the applied voltage in the equation (16), that is the square root of the sum of the squares of the d-axis component $v_d^*$ of the command voltage and the q-axis component $v_q^*$ of the command voltage that are outputs of the command voltage value computer 52.

The error compensator 57 amplifies the difference between the amplitude $V^*$ of the command voltage and the amplitude $V_{dq}$ of the applied voltage, which corresponds to the second term of the equation (16).

The command current d-axis component computer 54 receives the q-axis component $i_q^*$ of the command current, the command velocity $\omega_{re}^*$ the amplitude $V^*$ of the command voltage and the output of the error compensator 57 and outputs the corrected d-axis component $i_d^*$ of the command current corresponding to $i_d^*$ in the equation (16).

Figure 4:
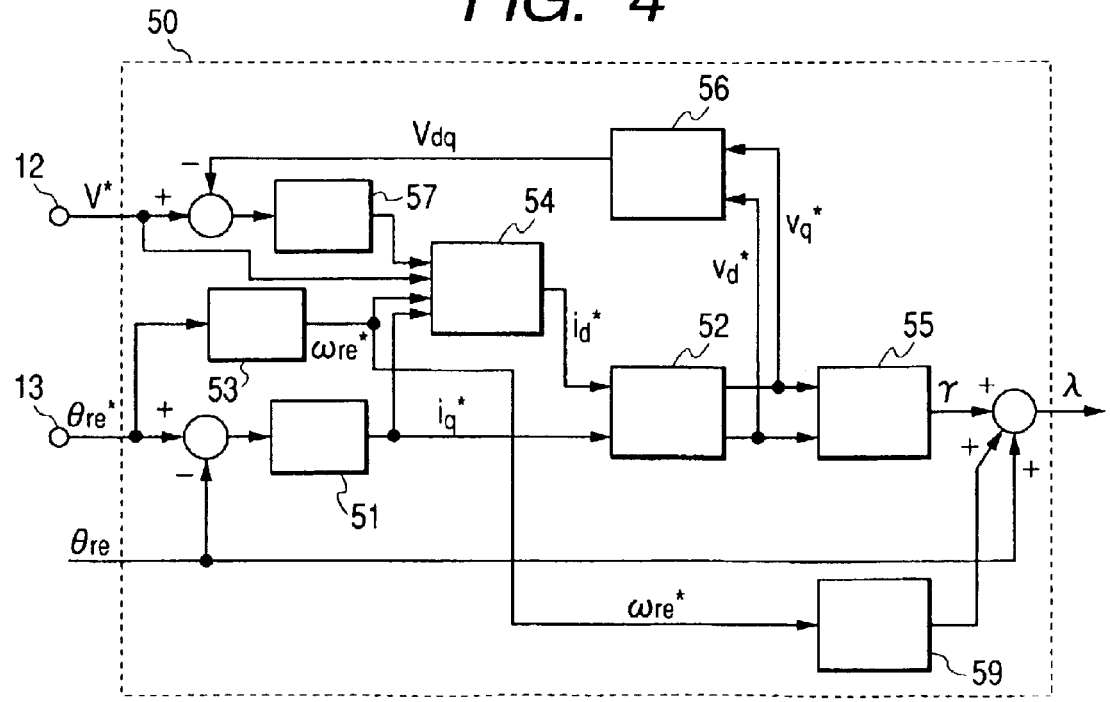
FIG. 4 is a block diagram of a lead angle computing element of the stepping motor driver according to a third embodiment of the present invention.

FIG. 4 is a block diagram of a lead angle computing element 50 of the stepping motor driver according to a third embodiment of the present invention. In this embodiment, a value proportional to the velocity of the rotor is added to the excitation angle γ to compensate for an influence of a time spent in sampled data control, for example. For this purpose, a multiplier 59 that is a multiplier means is added to the lead angle computing element 50 in the second embodiment. The multiplier 59 multiplies the command velocity $\omega_{re}^*$ that is the output of the velocity detector 53 by a coefficient. The output of the multiplier 59 is added to the excitation angle γ to obtain the corrected lead angle control signal λ compensated for the influence of the time spent.

Figure 5:
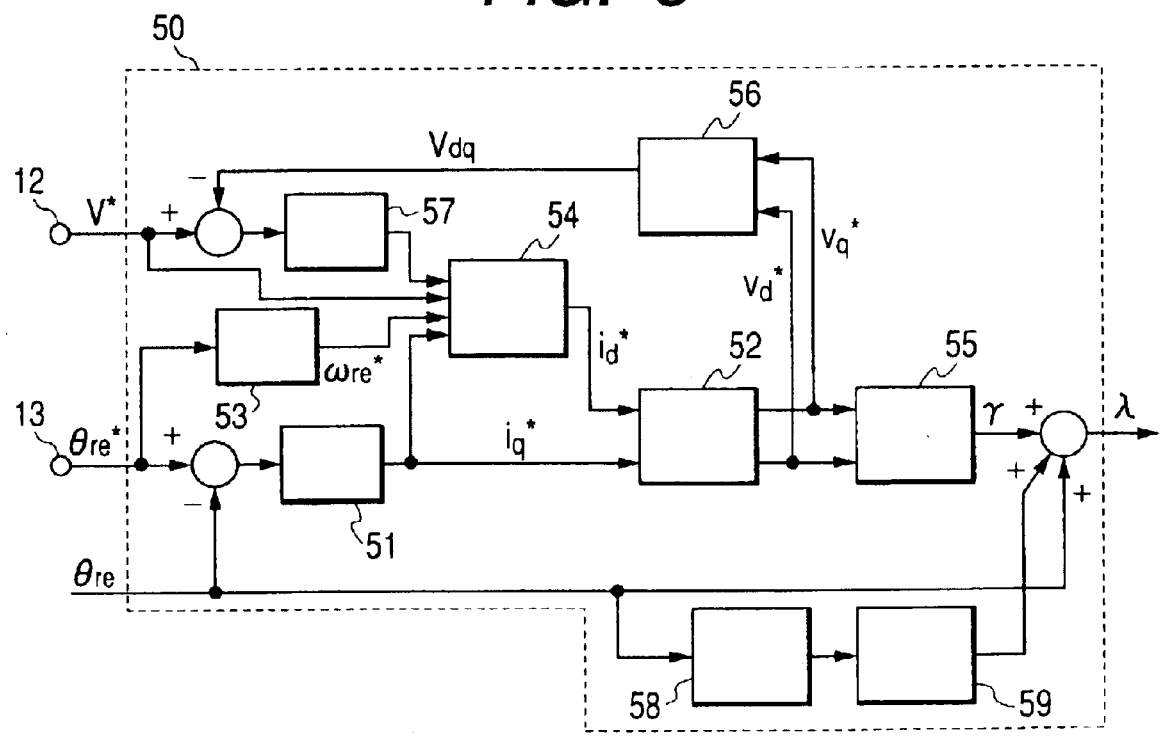
FIG. 5 is a block diagram of a lead angle computing element of the stepping motor driver according to a fourth embodiment of the present invention.

FIG. 5 is a block diagram of a lead angle computing element 50 of the stepping motor driver according to a fourth embodiment of the present invention.

In this embodiment, similar to the third embodiment, a value proportional to the velocity of the rotor is added to the excitation angle γ to compensate for an influence of a time spent in sampled data control, for example. In this embodiment, however, the value proportional to the velocity to be added to the excitation angle γ is obtained from the detected angle $\theta_{re}$.

For this purpose, a velocity detector 58 that is a velocity detection means and a multiplier 59 that is a multiplier means are added to the lead angle computing element 50 in the second embodiment.

The velocity detector 58 differentiates the detected angle $\theta_{re}$ to obtain a detected velocity.

The multiplier 59 multiplies the detected velocity that is the output of the velocity detector 58 by a coefficient. The output of the multiplier 59 is added to the excitation angle γ to obtain the corrected lead angle control signal λ compensated for the influence of the time spent.

In the embodiments explained above, the amplitude $I_p^*$ of the command current is transformed into the command current values $i_\alpha^*$ and $i_\beta^*$ in the α-β fixed coordinate system, then these values are compared respectively with the detected current values $i_{\alpha f}$ and $i_{\beta f}$ in the α-β fixed coordinate system to carry out the control. Alternatively, the detected current value $i_{\alpha f}$ and $i_{\beta f}$ may be transformed into values in the d-q rotational coordinate system to carry out the control in the rotational coordinate system.

Also in the embodiments explained above, the explanation is made for a two-phase stepping motor by way of example, however, the stepping motor driver according to the present invention is also applicable to a polyphase stepping motor.

The stepping motor driver according to the present invention drives a stepping motor in the condition conformable to the voltage equation for a synchronous motor even in a high speed region. Accordingly, a stable driving of the stepping motor, matching the load and being prevented from a stepping-out, can be maintained.

Also, since command signals given from the outside are used in the control computation, a stable operation of a stepping motor can be realized.

Further, by providing the means for compensating for the computation errors, a micro step drive of a stepping motor with high degree of accuracy can be realized.

Further, the stepping motor driver according to the present invention has a simple structure, accordingly, is low in price, can reduce noise and vibration of the motor, and can be used as a stepping motor driver for a polyphase stepping motor.

What is claimed is:

1. A stepping motor driver comprising:
   an inverter for feeding stepped currents to windings of a stepping motor;
   a position detection means for obtaining a detected angle of a rotor of said stepping motor; and
   a current control means for controlling said inverter, wherein:
   in a d-q rotational coordinate system in which the d-axis is in the direction of the magnetic flux of said rotor of said stepping motor and the q-axis is in the direction perpendicular to said d-axis, an excitation angle for a winding is determined from a d-axis component and a q-axis component of a command current to said winding;
   a lead angle control signal is computed from said excitation angle; and
   a phase of an applied voltage to said stepping motor is controlled using said lead angle control signal.

2. The stepping motor driver according to claim 1, wherein said d-axis component and said q-axis component of said command current to said winding are determined using a command angle given from the outside, said detected angle detected by said position detection means, a command velocity obtained by differentiating said command angle and an amplitude of an command voltage.

3. The stepping motor driver according to claim 2, wherein said q-axis component of said command current to said winding is a value obtained by amplifying a position deviation that is the difference between said command angle and said detected angle, by a compensation means comprising a differentiating element.

4. The stepping motor driver according to claim 2, wherein said d-axis component of said command current to said winding is compensated, by an error compensation means, using a value obtained by amplifying the difference between said amplitude of said command voltage and an applied voltage amplitude composed of a d-axis component and a q-axis component of said command voltage obtained respectively from said d-axis component and said q-axis component of said command current to said winding.

5. The stepping motor driver according to claim 3, wherein said d-axis component of said command current to said winding is compensated, by an error compensation means, using a value obtained by amplifying the difference between said amplitude of said command voltage and an applied voltage amplitude composed of a d-axis component and a q-axis component of said command voltage obtained respectively from said d-axis component and said q-axis component of said command current to said winding.

6. The stepping motor driver according to claim 2, wherein a value proportional to velocity of said rotor is added to said excitation angle.

7. The stepping motor driver according to claim 3, wherein a value proportional to velocity of said rotor is added to said excitation angle.

8. The stepping motor driver according to claim 4, wherein a value proportional to velocity of said rotor is added to said excitation angle.

9. The stepping motor driver according to claim 5, wherein a value proportional to velocity of said rotor is added to said excitation angle.

10. The stepping motor driver according to claim 6, wherein said command velocity is used as said velocity of said rotor.

11. The stepping motor driver according to claim 7, wherein said command velocity is used as said velocity of said rotor.

12. The stepping motor driver according to claim 8, wherein said command velocity is used as said velocity of said rotor.

13. The stepping motor driver according to claim 9, wherein said command velocity is used as said velocity of said rotor.

14. The stepping motor driver according to claim 6, wherein a detected velocity is used as said velocity of said rotor.

15. The stepping motor driver according to claim 7, wherein a detected velocity is used as said velocity of said rotor.

16. The stepping motor driver according to claim 8, wherein a detected velocity is used as said velocity of said rotor.

17. The stepping motor driver according to claim 9, wherein a detected velocity is used as said velocity of said rotor.

* * * * *